Jan. 3, 1928.
A. PRIPUTNEVICH
1,655,239
HEIGHT GAUGE
Filed Sept. 26, 1925
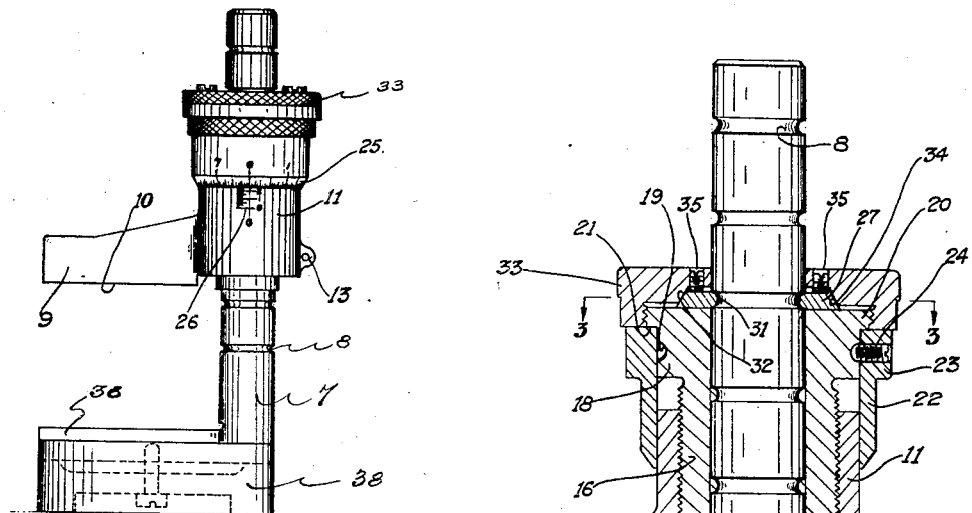
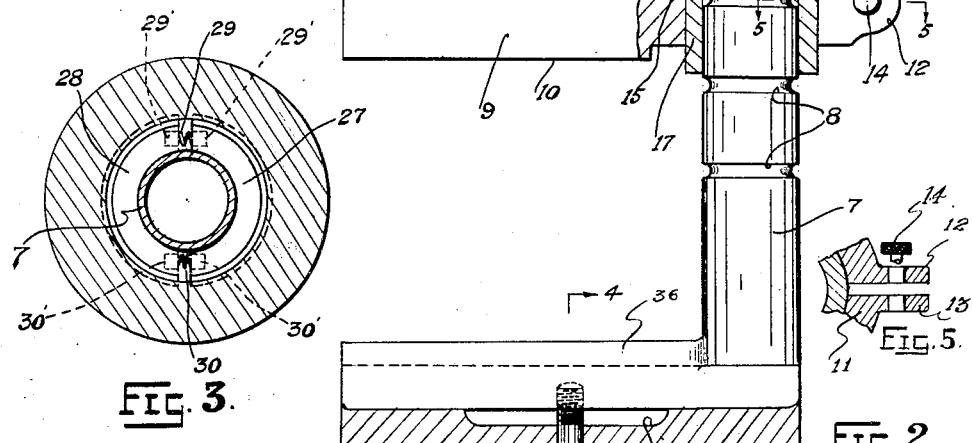
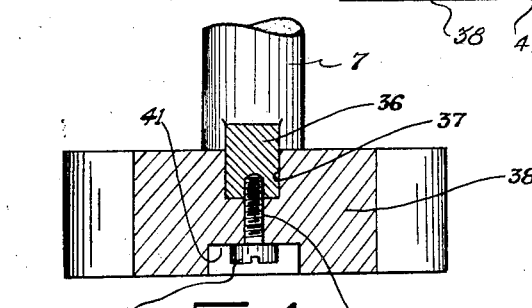
INVENTOR.
ALEXANDER PRIPUTNEVICH
BY
ATTORNEY.

Patented Jan. 3, 1928.

1,655,239

UNITED STATES PATENT OFFICE.

ALEXANDER PRIPUTNEVICH, OF HAMTRAMCK, MICHIGAN.

HEIGHT GAUGE.

Application filed September 26, 1925. Serial No. 58,712.

My invention relates to a new and useful improvement in a gauge, particularly adaptable for use as a height gauge for measuring height and thickness of various materials, and especially adapted for laying off work on work pieces.

It is an object of the present invention to provide a gauge of this class, which will be simple in structure, economical to manufacture, and highly efficient in use.

Another object of the invention is the provision of a device of this class having a standard provided with a plurality of peripheral grooves formed thereon at predetermined intervals and provided with a calibration device supported by an engaging member in said grooves and rotatable thereon.

Another object of the invention is the provision in a device of this class of a supporting member having a plurality of peripheral grooves formed therein and provided with a split locking washer for engaging in said grooves and supporting a calibration mechanism on said supporting member.

Another object of the present invention is the provision of a device of this class which may be adjusted to various sizes and securely locked in its various positions of adjustment.

Other objects will appear hereinafter.

The invention consists in the combination and arrangement of parts hereinafter described and claimed.

The invention will be best understood from a reference to the accompanying drawings, which form a part of this specification and in which, Fig. 1 is a side elevational view of the invention, Fig. 2 is an enlarged central vertical sectional view of the invention, Fig. 3 is a sectional view taken on substantially line 3—3 of Fig. 2, Fig. 4 is a sectional view taken on substantially line 4—4 of Fig. 2, Fig. 5 is a fragmentary sectional view taken on substantially line 5—5 of Fig. 2.

As shown in the drawings, the invention comprises an upright supporting member 7, which is formed tubular and provided with a plurality of spaced peripheral grooves 8. An engaging arm 9 having an engaging surface 10 is projected outwardly from a sleeve 11 having the major portion of its interior threaded and provided, adjacent its base, with a reduced bore 15. Threaded into the threaded portion of the sleeve 11 is an exteriorly threaded sleeve 16, which is adapted to embrace the upright supporting member 7. As shown in the drawings, the sleeve 16 is provided at its lower end with a reduced portion 17 engageable snugly in the bore 15. Formed on the sleeve 16, at the upper end thereof, is an enlarged annular flange or head 18 having recesses 19 formed on its periphery. Projecting outwardly from the upper end of the head 18 is a peripherally threaded flange 20 providing a shoulder 21 against which the graduated sleeve 22 engages. As shown in the drawings, this sleeve 22 is positioned in embracing relation over the sleeve 11 and the head 18, a set screw 24 being projected through a head 23 formed on the sleeve 22 and projected into one of the peripheral recesses 19 to secure the sleeve 22 against movement relatively to the sleeve 16. As clearly appears in Fig. 1, the lower end of the sleeve 22 is chamfered to provide the beveled surface 25 upon which graduations are formed. These graduations co-operate with the longitudinally extending line 26 formed on the sleeve 11 to indicate the amount of turning of the sleeve 16 in the sleeve 11. As shown in Fig. 1, the sleeve 11 is also provided with graduations to indicate the longitudinal movement of the sleeve 22 relatively to the sleeve 11. A locking washer is provided for locking the calibration mechanism on the upright or supporting standard 7. This locking washer comprises a pair of semi-circular members 27 and 28, normally spaced apart as shown in Fig. 3, by the springs 29 and 30 engaging in the pockets 29' and 30' formed in the sections 27 and 28.

In use, the device is mounted in the position shown in Fig. 2, and the engaging arm 9 is moved so as to extend over the material to be measured. A contact arm 36, which projects outwardly from the base of the supporting standard 7 engages the undersurface of the work piece. The mechanism is then moved into such a position that the upper end of the sleeve 16 will lie in registration with one of the grooves 8, the groove selected being that which is closest to the distance to be measured. The washer sections 27 and 28 are then placed in embracing relation on the standard 7 and the cap 33 threaded onto the flange 21. As will be noted, the sections 27 and 28 are formed circular on their inner sides 31 and provided with a beveled surface 32 on their peripheries. The cap 33 is provided with a recess having beveled walls 34. As the cap 33 is threaded onto the flange 20, the beveled surface 33 will engage the beveled surface 32 of the sections 27 and 28, thus forcing these sections into close engagement with each other, so as to engage tightly in the peripheral groove 8. The sleeve 11 may then be moved longitudinally of the standard 7, so as to bring the arm 9 into engagement with the work piece. This movement of the sleeve 11 is effected by the arm 9 being manually held from rotation thereof and rotating the cap 33, sleeve 22 and the sleeve 16 which are secured together as a body. When the proper adjustment is obtained, the sleeve 11 is locked on the reduced portion 17 of the sleeve 16 by means of the set screw 14, which is projected through the lugs 12 and 13 formed on the sleeve 11, this sleeve 11 being longitudinally split at its lower end.

Set screws 35 are threaded into the cap 33 and adapted for engaging the upper surface of the sections 27 and 28, to assist in preventing relative movement of these parts. A base 38 is provided so that the device may be rested in upright position on the supporting surface. This base 38 is provided with a groove 37 for the reception of the engaging arm 36. As shown in Fig. 2, the base of the groove 37 is hollowed out as at 39 to provide a smaller engaging surface for the arm 36. Threaded into the arm 36 is a screw 40, the head of which engages in the recess 41 formed in the undersurface of the base 38.

It is evident that the calibration mechanism may be easily and quickly moved as a body on the standard 7 by releasing the engagement of the washer sections 27 and 28 from the peripheral grooves. This release is effected by unthreading the cap 33. After releasing the sections from engagement with the peripheral grooves a quick change may be made to various adjustments, the different peripheral grooves 8 indicating certain distances. If desired, this distance may be indicated on the supporting standard 7. It will be noted that the engaging surface 10 of the arm 9 projects downwardly below the lower end of the sleeve 11, so that the sleeve 11 will never be brought into engagement with the engaging arm 36.

The structure is a durable one and highly efficient for the purposes intended. A calibration to small degrees is possible with a device of this class. The circumferentially extending lines on the sleeve 11, which are numbered, indicate the thousandth of an inch and the lines on the beveled surface 25 indicate one twenty-five thousandths of an inch.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

1. A height gauge of the class described, comprising a supporting member, having a plurality of peripheral grooves formed thereon at spaced intervals; an exteriorly threaded sleeve loosely positioned on said supporting member; an interiorly threaded sleeve threaded on said exteriorly threaded sleeve and movable axially thereof upon rotation of said exteriorly threaded sleeve; an engaging arm projecting outwardly from said interiorly threaded sleeve; an engaging arm projecting outwardly from one end of said supporting member; a split washer mounted on said supporting member in embracing relation; means threadable on said exteriorly threaded sleeve for forcing said washer into engagement with one of the grooves on said supporting member for retaining said exteriorly threaded sleeve in fixed relation longitudinally of said supporting member; and a graduated sleeve mounted on said exteriorly threaded sleeve and embracing said interiorly threaded sleeve and adapted for indicating longitudinal movement of said interiorly threaded sleeve relatively to said exteriorly threaded sleeve upon rotation thereof.

2. A height gauge of the class described, comprising a supporting member, having a plurality of peripheral grooves formed thereon at spaced intervals; an exteriorly threaded sleeve loosely positioned on said supporting member; an interiorly threaded sleeve threaded on said exteriorly threaded sleeve and movable axially thereof upon rotation of said exteriorly threaded sleeve; an engaging arm projecting outwardly from said interiorly threaded sleeve; an engaging arm projecting outwardly from one end of said supporting member; a split washer mounted on said supporting member in embracing relation; means threadable on said exteriorly threaded sleeve for forcing said washer into engagement with one of the grooves on said supporting member for retaining said exteriorly threaded sleeve in fixed relation longitudinally of said supporting member; a graduated sleeve mounted on said exteriorly threaded sleeve and embracing said interiorly threaded sleeve and adapted for indicating longitudinal movement of said interiorly threaded sleeve, relatively to said exteriorly threaded sleeve, upon rotation thereof; and a base mounted on said engaging member projecting outwardly from said supporting member.

3. A height gauge of the class described, comprising a supporting member, having a plurality of peripheral grooves formed thereon at spaced intervals; an exteriorly threaded sleeve loosely positioned on said supporting member; an interiorly threaded sleeve threaded on said exteriorly threaded sleeve and movable axially thereof upon rotation of said exteriorly threaded sleeve; an engaging arm projecting outwardly from said interiorly threaded sleeve; an engaging arm projecting outwardly from one end of said supporting member; a split washer mounted on said supporting member in embracing relation; means threadable on said exteriorly threaded sleeve for forcing said washer into engagement with one of the grooves on said supporting member for retaining said exteriorly threaded sleeve in fixed relation longitudinally of said supporting member; a graduated sleeve mounted on said exteriorly threaded sleeve and embracing said interiorly threaded sleeve and adapted for indicating longitudinal movement of said interiorly threaded sleeve relatively to said exteriorly threaded sleeve upon rotation thereof; a base mounted on said engaging member projecting outwardly from said supporting member; and resilient means for normally moving said split washer out of engagement with said supporting member.

In testimony whereof, I have signed the foregoing.

ALEXANDER PRIPUTNEVICH.